(12) United States Patent
Wang (10) Patent No.: US 9,036,432 B2
(45) Date of Patent: May 19, 2015

(54) METHOD FOR CONTROLLING DATA WRITE OPERATION OF A MASS STORAGE DEVICE

(75) Inventor: Chun-Chieh Wang, Changhua County (TW)

(73) Assignee: Transcend Information, Inc., NeiHu Dist, Taipei (TW)

(*) Notice: Subject to any disclaimer, the term of this patent is extended or adjusted under 35 U.S.C. 154(b) by 316 days.

(21) Appl. No.: 13/530,071

(22) Filed: Jun. 21, 2012

(65) Prior Publication Data
US 2013/0346670 A1  Dec. 26, 2013

(51) Int. Cl.
*G11C 7/00* (2006.01)
*G11C 7/22* (2006.01)
*G06F 1/30* (2006.01)

(52) U.S. Cl.
CPC ...................................... *G06F 1/305* (2013.01)

(58) Field of Classification Search
USPC .................. 365/149, 189.11, 189.14, 189.15, 365/189.16
See application file for complete search history.

(56) References Cited

U.S. PATENT DOCUMENTS

| 2005/0122791 A1* | 6/2005 | Hajeck .................... 365/189.11 |
| 2005/0152202 A1  | 7/2005 | Choi |
| 2007/0103994 A1* | 5/2007 | Ahmed et al. ........... 365/189.11 |
| 2009/0225608 A1* | 9/2009 | Carey et al. .............. 365/189.09 |
| 2012/0120729 A1* | 5/2012 | Yuh .......................... 365/185.19 |

* cited by examiner

*Primary Examiner* — Thao H Bui
(74) *Attorney, Agent, or Firm* — Winston Hsu; Scott Margo (57) ABSTRACT

A method for controlling data write operation of a mass storage device is provided. The mass storage device has a controller and a memory unit. The method includes connecting the mass storage device to a host device, and receiving a voltage provided from the host device; sensing and monitoring whether the voltage is lower than a first predefined voltage; writing data to the mass storage device with a first frequency when the sensed voltage is higher than the first predefined voltage; and writing data to the mass storage device with a second frequency when the sensed voltage is lower than the first predefined voltage, wherein the second frequency is adjusted by decreasing the first frequency.

17 Claims, 7 Drawing Sheets

METHOD FOR CONTROLLING DATA WRITE OPERATION OF A MASS STORAGE DEVICE

BACKGROUND

1. Technical Field

The present invention relates to a method for controlling data-write operation of amass storage device, and more particularly, to a method for controlling data-write operation of a mass storage device according to sensed input voltage of a memory unit.

2. Description of the Conventional Art

Figure 1:
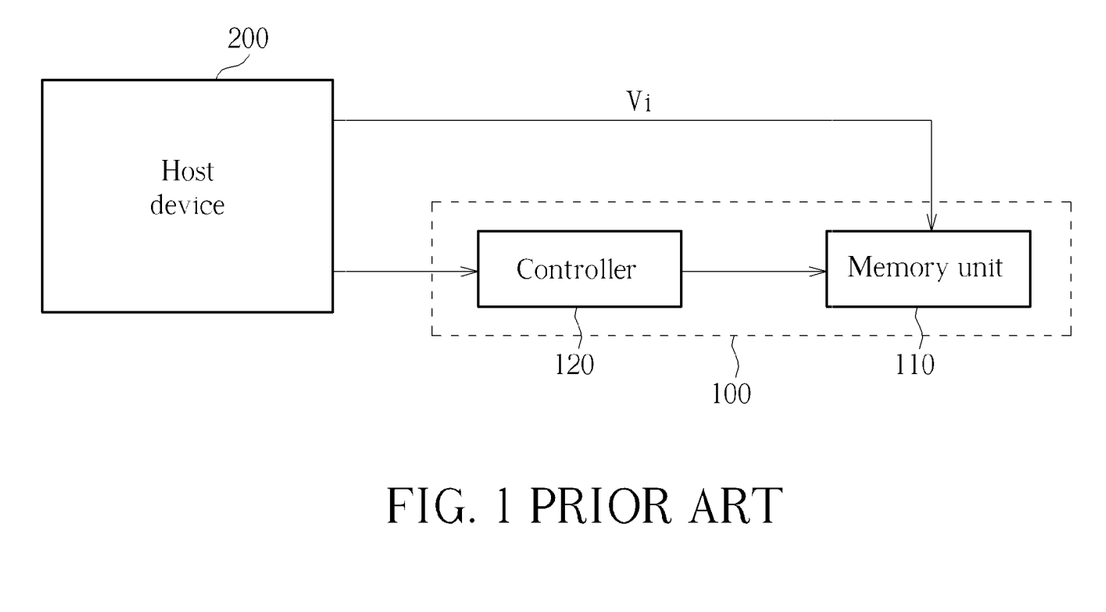
FIG. 1 is a diagram showing a mass storage device of the prior art.

As related technology keeps improving, various types of mass storage devices such as hard drives or flash drives are developed for storing data according to requirements. Please refer to FIG. 1. FIG. 1 is a diagram showing a mass storage device 100 of the conventional art. As shown in FIG. 1, the mass storage device 100 of the conventional art comprises a memory unit 110 (such as a flash memory unit), and a controller 120. The memory unit 110 is utilized for storing data, and the memory unit 110 is powered by an input voltage Vi(generally 3.3 volt) provided from a host device 200. The controller 120 is utilized for controlling data access of the memory unit 110, for example, the controller 120 can perform operations of writing data into the memory unit 110, reading data stored in the memory unit 110, and etc.

Generally, a flash memory unit works normally when working voltage of the flash memory unit is between 3.3 volt and 3.5 volt. When the working voltage of the flash memory unit is between 2.7 volt and 3.3 volt, the flash memory still can work, but may cause some data loss. When the working voltage of the flash memory unit is lower than 2.7 volt, the flash memory unit can not work normally, so as to significantly increase possibility of data loss.

Figure 2:
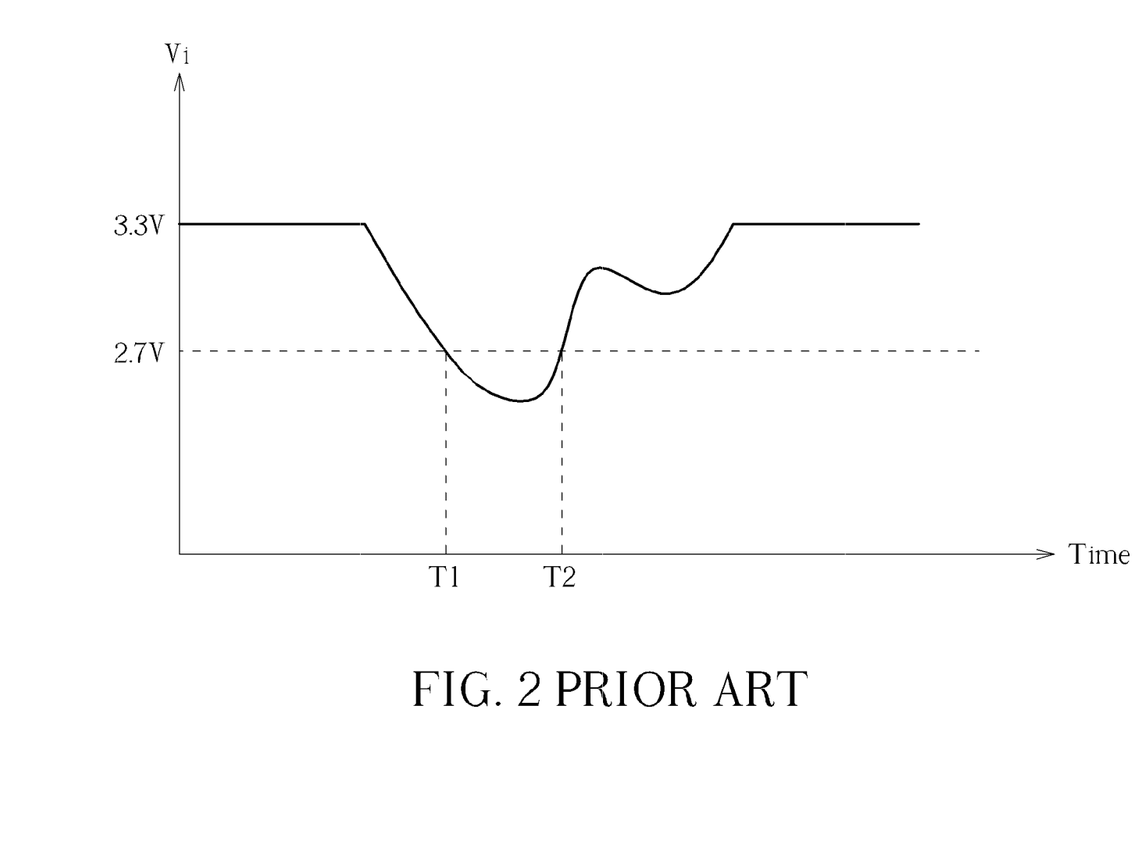
FIG. 2 is a diagram illustrating data write operation of the mass storage device of FIG. 1.

Please refer to FIG. 2, and refer to FIG. 1 as well. FIG. 2 is a diagram illustrating data write operation of the mass storage device 100 of FIG. 1. When the controller 120 performs data write operation, the controller 120 writes data into the memory unit 110 at a predetermined data write frequency, and the predetermined data write frequency is a fixed frequency. During the data write operation, when the host device 200 provides an unstable voltage to the mass storage device 100, and causes the input voltage Vi of the memory unit 110 to drop to a voltage level lower than 2.7 volt, the memory unit 110 may not work normally to write data due to insufficient voltage level, such that the data written into the memory unit 110 between time T1 and time T2 may be lost. The mass storage device 100 of the conventional art does not have any protection mechanism to prevent the above situation of data loss when the input voltage Vi of the memory unit 110 is unstable.

SUMMARY

The present invention provides a method for controlling data write operation of a mass storage device. The mass storage device has a controller and a memory unit. The method comprises connecting the mass storage device to a host device, and receiving a voltage provided from the host device or from an internal power supply unit; sensing and monitoring whether the voltage is lower than a first predefined voltage; writing data to the mass storage device with a first frequency when the sensed voltage is higher than the first predefined voltage; and writing data to the mass storage device with a second frequency when the sensed voltage is lower than the first predefined voltage, wherein the second frequency is adjusted by decreasing the first frequency.

The present invention further provides amass storage device. The mass storage device comprises a memory unit, for storing data; a sense unit, for sensing an input voltage of the memory unit; and a controller, coupled to the memory unit and the sense unit for adjusting a data write frequency of the memory unit according to sensed input voltage of the memory unit. The input voltage is selectively provided from a host device through a connecting interface, or from an internal power supply unit of the mass storage device.

These and other objectives of the present invention will no doubt become obvious to those of ordinary skill in the art after reading the following detailed description of the preferred embodiment that is illustrated in the various figures and drawings.

DETAILED DESCRIPTION

Figure 3A:
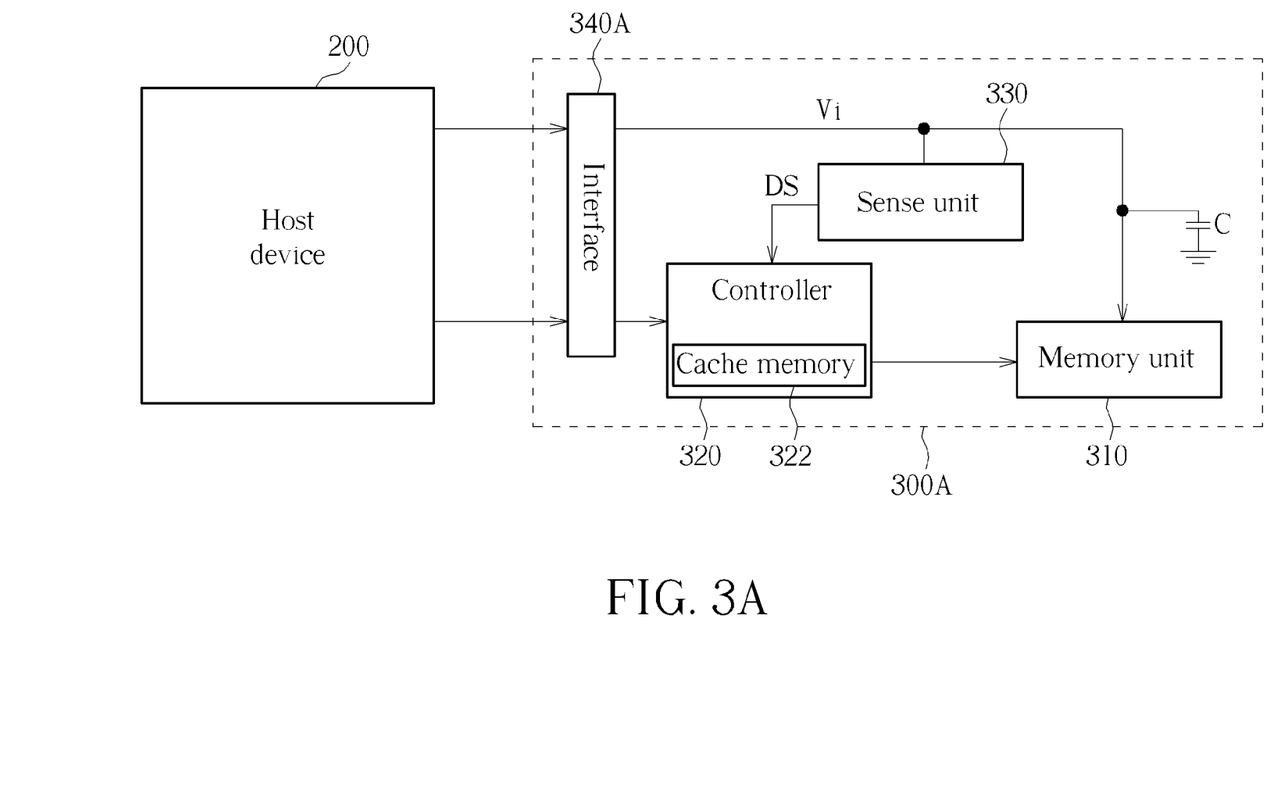
FIG. 3A is a diagram showing a mass storage device of the present embodiment.

Please refer to FIG. 3A. FIG. 3A is a diagram showing a mass storage device 300 of the preferred embodiment of the present invention. As shown in FIG. 3A, the mass storage device 300A comprises a memory unit 310, a sense unit 330, and a controller 320. In convention, the mass storage 300A can be coupled to the host device 200 through a connecting interface 340A, ex. USB, to receive a controlling command and working voltage provided from the host device 200, and the connecting interface 340A is coupled to the controller 320 of the mass storage 300. The memory unit 310 can be flash memory for storing data, and the memory unit 310 is coupled to the controller 320 and powered by an input voltage Vi (such as 3.3 volt) provided from a host device 200. The sense unit 330 is utilized for sensing the input voltage Vi of the memory unit 310. In another preferred embodiment of the present invention, the sense unit 330 can be integrated into the controller 320 such as being a part of the controller 320. The sense unit 330 can be an analog-to-digital converter for converting sensed input voltage from an analog signal to a digital signal DS, and the sense unit 330 can further transmit the digital signal DS to the controller 320 for notifying the sensed input voltage to the controller 320. The controller 320 is coupled to the sense unit 330 and the memory unit 310, and utilized for controlling data access of the memory unit 310. For example, the controller 320 can perform operations of writing data into the memory unit 310, reading data stored in the memory unit 310, and etc. according to the controlling command from the host device 200. During data write operation, the controller 320 can provide a protection mechanism according to the digital signal DS transmitted from the sense unit 330, in order to prevent the situation of data loss when the input voltage Vi of the memory unit 310 is unstable.

Figure 3B:
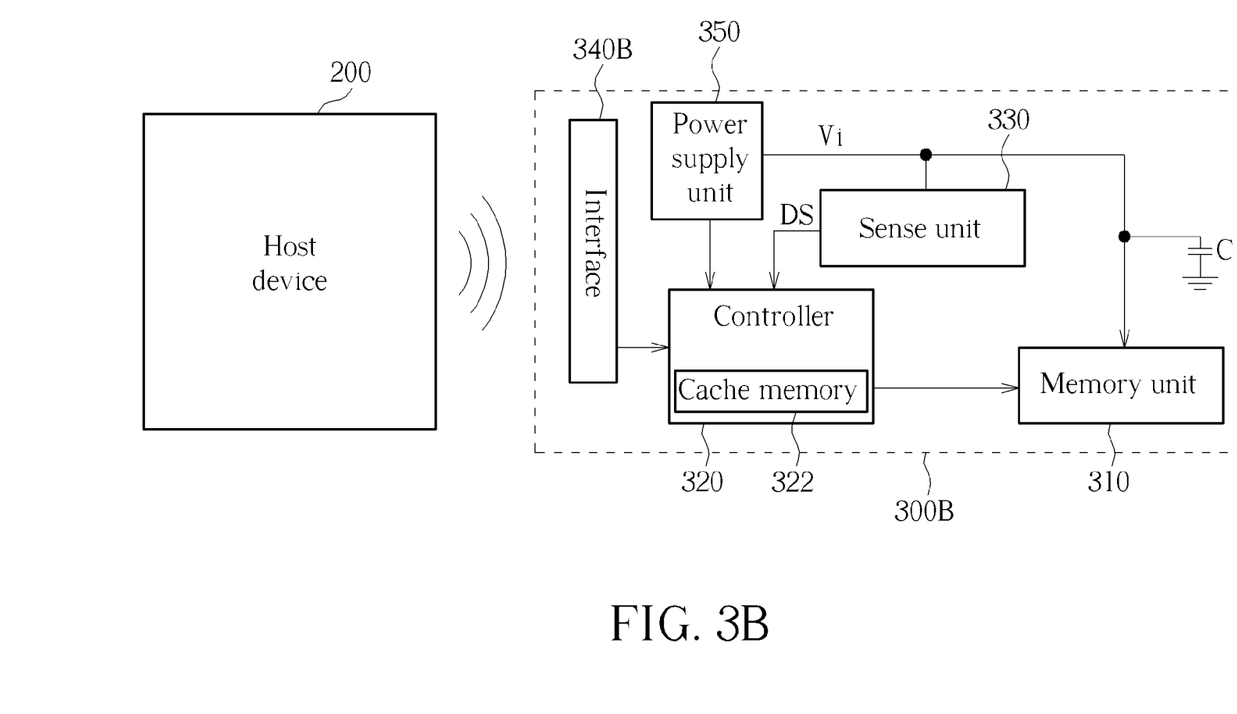
FIG. 3B is a diagram showing another mass storage device of the present embodiment.

Please refer to FIG. 3B. FIG. 3B is a diagram showing another mass storage device 300B of another preferred embodiment of the present invention. Comparing to the mass storage device 300A of FIG. 3A, the mass storage device 300B further comprises a power supply unit 350, which is coupled to the controller 330 and the memory unit 310. The power supply unit 350 may be a battery or a continuous power supply, which may store the natural energy into a battery (such as a solar battery). In this preferred embodiment, the input voltage Vi (such as 3.3 volt) is provided from the power supply unit 350, and the host device 200 may only provides command and data for writing to the memory unit 310 through the connecting interface 340B, which may be a wireless connecting interface ex. WiFi, Bluetooth etc., of the mass storage device 300B. The sense unit 330 is utilized for sensing the input voltage Vi provided from the power supply unit 350. Similar to the preferred embodiment described in the FIG. 3A, the sense unit 330 can be integrated into the controller 320 such as being a part of the controller 320, and can be an analog-to-digital converter for converting sensed input voltage from an analog signal to a digital signal DS.

Figure 4:
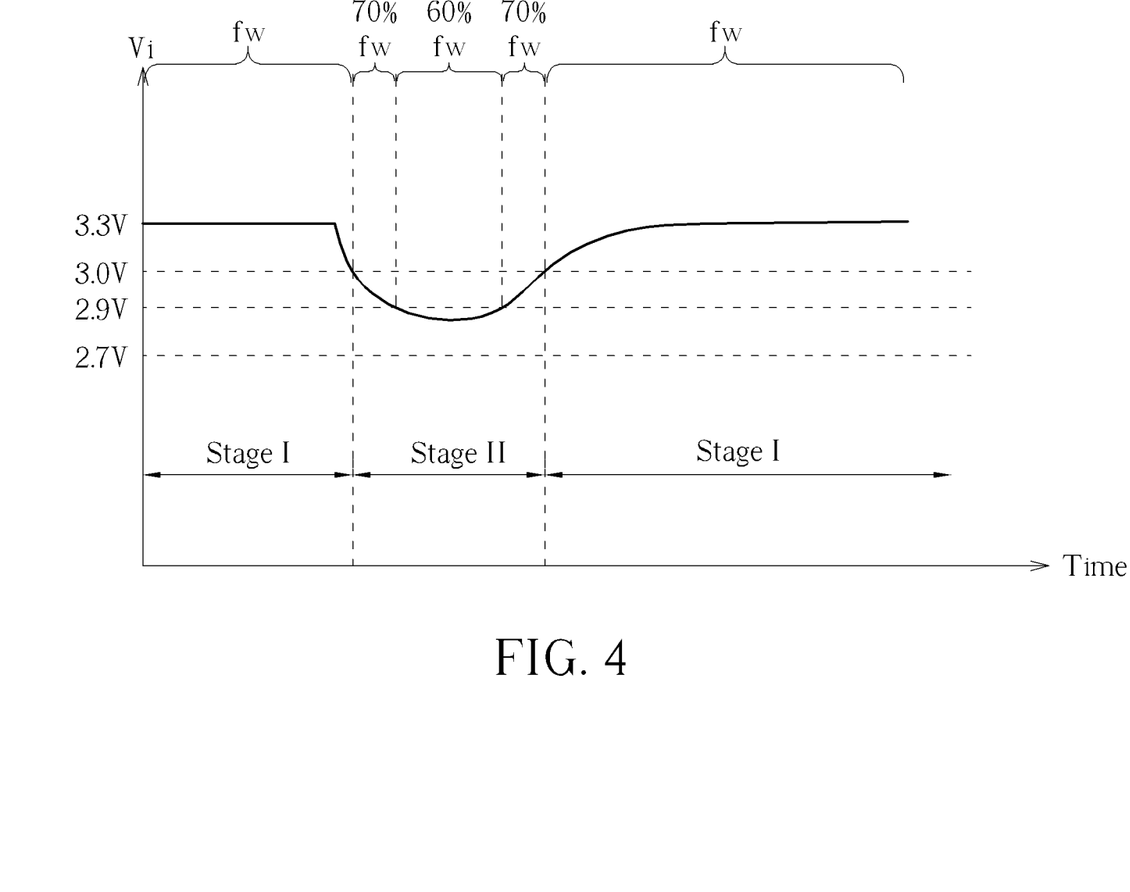
FIG. 4 is a diagram illustrating an embodiment of the controller performing the protection mechanism when the input voltage is unstable.

For example, please refer to FIG. 4, FIG. 4 is a diagram illustrating an embodiment of the controller performing the protection mechanism when the input voltage is unstable. As shown in FIG. 4, the data write operation of the mass storage device 300 can be divided into several stages. In stage I, the input voltage Vi provided from the host device is above a first predefined voltage (such as 3.0 volt), the controller 320 determines the input voltage Vi is stable according to the digital signal DS transmitted from the sense unit 330, and controls a data write frequency of the memory unit 310 at a predetermined write frequency fw. The first predefined voltage is the voltage over a level, which can be provided to the mass storage device 300 for operating normally. When the host device 200 provides an unstable voltage to the mass storage device 300, and causes the input voltage Vi of the memory unit 310 to drop to a voltage level lower than the first predefined voltage, which is in stage II, the controller 320 determines the input voltage Vi is unstable according to the digital signal DS transmitted from the sense unit 330, and adjusts the data write frequency of the memory unit 310 at a lower write frequency, ex. 70% of the predetermined data write frequency fw, in order to reduce power consumption of the mass storage device 300 (that is for reducing the loading of the host device 200). If the input voltage Vi of the memory unit 310 continues to drop to a voltage level lower than a second predefined voltage (such as 2.9 volt), the controller 320 determines the input voltage Vi is still unstable according to the digital signal DS transmitted from the sense unit 330, and adjusts the data write frequency of the memory unit 310 at another lower write frequency, ex. 60% of the predetermined data write frequency fw, in order to further reduce more power consumption of the mass storage device 300.

When the host device 200 restores to provide a stable input voltage to the mass storage device 300, the input voltage Vi of the memory unit 310 will climb up. When the input voltage Vi of the memory unit 310 climbs up to the voltage level between the first predefined voltage and the second predefined voltage, the controller 320 controls the data write frequency of the memory unit 310 at 70% of the predetermined data write frequency fw, and when the input voltage Vi of the memory unit 310 keeps climbing up to the voltage level higher than the first predefined voltage, the controller 320 determines the input voltage Vi of the memory unit 310 is back to normal status again, and controls the data write frequency of the memory unit 310 back to the predetermined data write frequency fw.

It should be noticed that the value of each of the predefined voltage and the corresponding decreasing percentage of the data write frequency, can be set up according to different condition and different apparatus. The basic principle to set up the condition is to satisfy the notification of lacking input voltage and protection of data writing when operating the mass storage apparatus.

According to the above arrangement, the mass storage device 300 in the preferred embodiment of the present invention can adjust the data write frequency of the memory unit 310 according to the sensed input voltage of the memory unit 310 in order to reduce loading of the host device 200, such that the input voltage Vi of the memory unit 310 can be recovered back to normal status. Therefore, the controller 320 can keep the input voltage Vi of the memory unit 310 above 2.7 volt for preventing the situation of data loss when the input voltage Vi of the memory unit 310 is insufficient.

Figure 5:
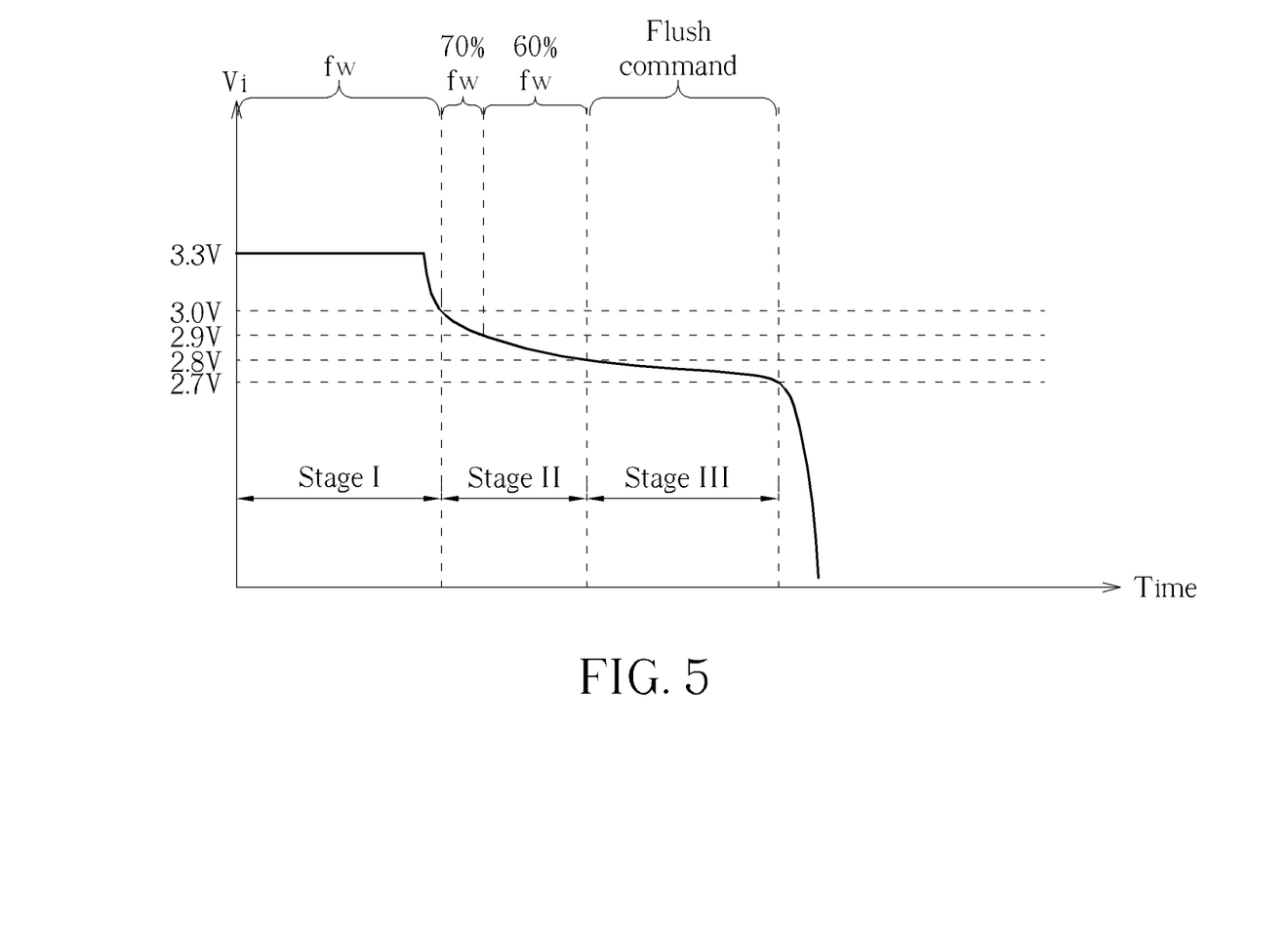
FIG. 5 is a diagram illustrating another embodiment of the controller performing the protection mechanism when the input voltage is unstable.

Please refer to FIG. 5, FIG. 5 is a diagram illustrating another embodiment of the controller performing the protection mechanism when the input voltage is unstable. As shown in FIG. 5, in stage I, the input voltage Vi provided from the host device 200 or from the internal power supply unit 350 is above the first predefined voltage (such as 3.0 volt), the controller 320 determines that the input voltage Vi is stable according to the digital signal DS transmitted from the sense unit 330, and controls the data write frequency of the memory unit 310 at the predetermined write frequency fw. When the host device 200 or the power supply unit 350 provides an unstable voltage to the mass storage device 300, and causes the input voltage Vi of the memory unit 310 to drop to a voltage level lower than the first predefined voltage, which is in stage II, the controller 320 determines the input voltage Vi is unstable according to the digital signal DS transmitted from the sense unit 330, and controls the data write frequency of the memory unit 310 lower than the predetermined data write frequency fw, ex. at 70% of the predetermined data write frequency fw, in order to reduce power consumption of the mass storage device 300. If the input voltage Vi of the memory unit 310 continues to drop to a voltage level lower than the second predefined voltage (such as 2.9 volt), the controller 320 determines the input voltage Vi is still unstable according to the digital signal DS transmitted from the sense unit 330, and controls the data write frequency of the memory unit 310 at 60% of the predetermined data write frequency fw, in order to further reduce more power consumption of the mass storage device 300. If the input voltage Vi of the memory unit 310 continues to drop to a voltage level lower than a third predefined voltage (such as 2.8 volt), which is in stage III, the controller 320 determines the power may be lost very soon according to the digital signal DS transmitted from the sense unit 330, and executes a flush command to stop writing data from the host device 200 and meanwhile writing data stored in a cache memory 322 of the controller 320 to the memory unit 310, in order to write a complete set of data into the memory unit 310 before power loss.

In addition, in stage II of FIG. 5, more voltage levels can be set as reference for adjusting the data write frequency of the memory unit 310, and the data write frequency of the memory unit 310 can be adjusted to any other percentage of the predetermined data write frequency according to design requirements. Furthermore, the mass storage device 300 can further comprise a capacitor C coupled to the memory unit 310, such that the capacitor C can provide a temporary backup power for executing the flush command in stage III.

As mentioned in the previous preferred embodiment of the present invention, it should be noticed that the value of each of the predefined voltage and the corresponding decreasing percentage of the data write frequency, can be set up according to different conditions and different apparatus. The basic principle to set up the condition is to satisfy the notification of lacking input voltage and protection of data writing when operating the mass storage apparatus.

Figure 6:
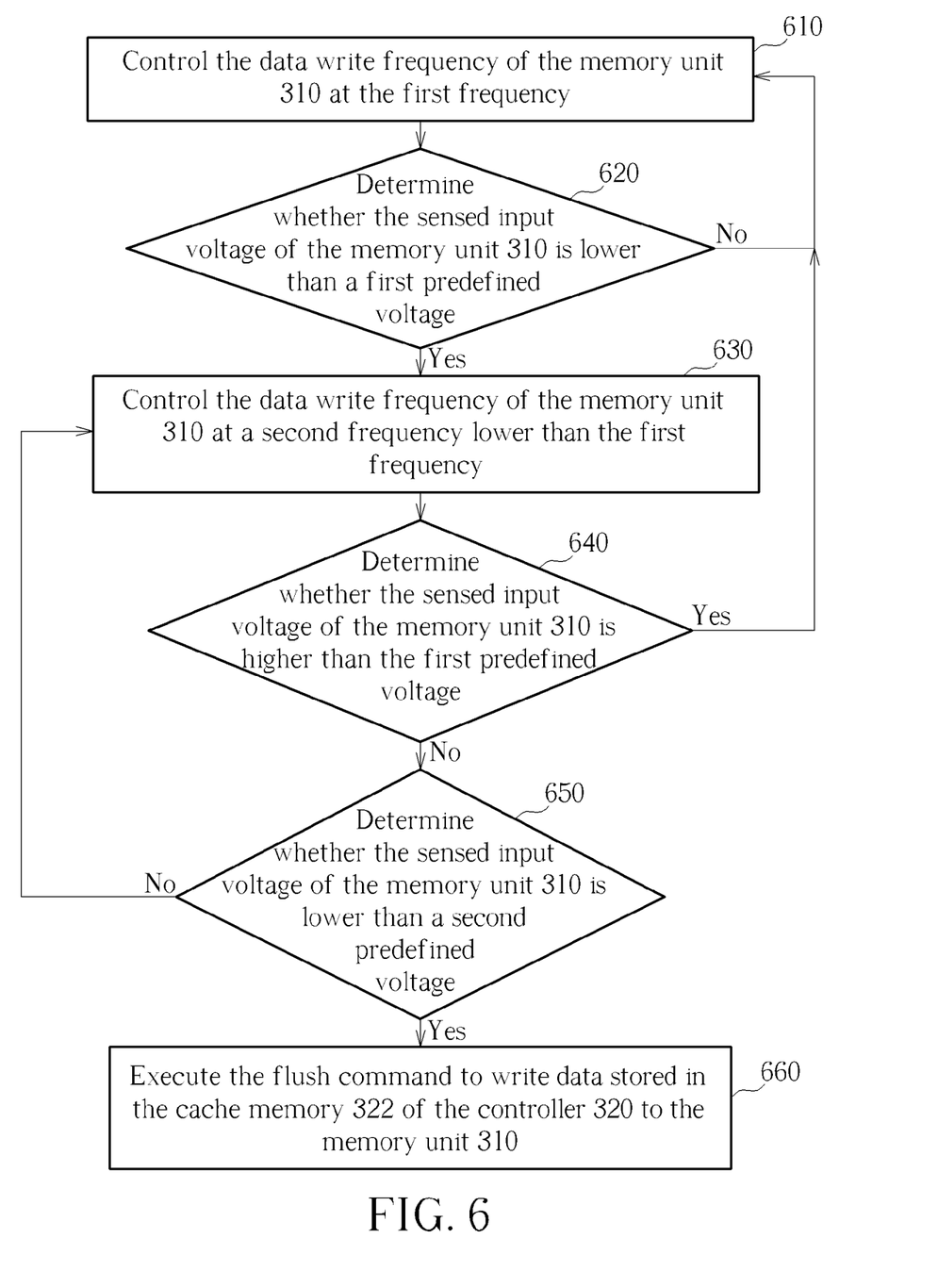
FIG. 6 is a flowchart of the method of the present embodiment for controlling data write operation of the mass storage device.

Please refer to FIG. 6, which is a flowchart 600 of the method of the present embodiment for controlling data write operation of amass storage device. The flowchart 600 comprises the following steps of:

Step 610: Control the data write frequency of the memory unit 310 at the first frequency;

Step 620: Determine whether the sensed input voltage of the memory unit 310 is lower than a first predefined voltage; if yes, go to step 630; if not, go to step 610;

Step 630: Control the data write frequency of the memory unit 310 at a second frequency lower than the first frequency;

Step 640: Determine whether the sensed input voltage of the memory unit 310 is higher than the first predefined voltage; if yes, go to step 610; if not, go to step 650;

Step 650: Determine whether the sensed input voltage of the memory unit 310 is lower than a second predefined voltage; if yes, go to step 660; if not, go to step 630; and Step 660: Execute the flush command to stop writing data from the host device 200 and meanwhile writing data stored in the cache memory 322 of the controller 320 to the memory unit 310.

Basically, to achieve the same result, the steps of the flowchart 600 need not be in the exact order shown and need not be contiguous. That is, other steps can be inserted therebetween.

In contrast to the conventional art, the mass storage device of the preferred embodiment of the present invention can adjust the data write frequency of the memory unit according to the sensed input voltage provided from the host device or from the internal power supply unit of the memory unit, in order to keep the input voltage of the memory unit above a certain voltage level for preventing the situation of data loss when the input voltage of the memory unit is insufficient. In addition, the mass storage device of the preferred embodiment can further execute a flush command to write data stored in the cache memory of the controller to the memory unit, in order to write a complete set of data into the memory unit before power loss.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling data write operation of a mass storage device, the mass storage device having a controller and a memory unit, the method comprising:
   connecting the mass storage device to a host device;
   receiving a command and an input voltage for writing data to the memory unit;
   sensing the input voltage to generate a sensing signal corresponding to the input voltage;
   determining whether the input voltage is lower than a first predefined voltage according to the sensing signal;
   writing data to the mass storage device with a first frequency when the input voltage is higher than the first predefined voltage; and
   writing data to the mass storage device with a second frequency when the input voltage is lower than the first predefined voltage, wherein the second frequency is adjusted by decreasing the first frequency.

2. The method of claim 1, after the step of writing data to the mass storage device with the second frequency, further comprising steps of:
   determining whether the input voltage is higher than the first predefined voltage according to the sensing signal; and
   writing data to the mass storage device with the first frequency when the input voltage is higher than the first predefined voltage, wherein the first frequency is adjusted by increasing the second frequency.

3. The method of claim 2, wherein adjusting the second frequency to the first frequency is performed by the controller.

4. The method of claim 1, wherein adjusting the first frequency to the second frequency is performed by the controller.

5. The method of claim 1 further comprising steps of:
   determining whether the input voltage is lower than a second predefined voltage according to the sensing signal; and
   writing data stored in a cache memory integrated into the controller to the memory unit when the input voltage is lower than the second predefined voltage.

6. The method of claim 1, wherein the input voltage is provided from a power supply unit of the mass storage device.

7. The method of claim 1, wherein the input voltage is provided from the host device.

8. A mass storage device, comprising:
   a memory unit, for storing data;
   a sense unit, for sensing an input voltage of the memory unit to generate a sensing signal corresponding to the input voltage; and
   a controller, coupled to the memory unit and the sense unit for adjusting a data write frequency of the memory unit according to the sensing signal;
   wherein the controller is configured to adjust the data write frequency of the memory unit from a first frequency to a second frequency which is lower than the first frequency when the input voltage of the memory unit is lower than a first predefined voltage, and to adjust the data write frequency of the memory unit from the second frequency to the first frequency when the input voltage of the memory unit is higher than the first predefined voltage.

9. The mass storage device of claim 8, wherein the controller is further configured to execute a flush command to write data stored in a cache memory of the controller to the memory unit when the input voltage of the memory unit is lower than a second predefined voltage.

10. The mass storage device of claim 9 further comprising a capacitor coupled to the memory unit for providing a temporary backup power for the controller to execute the flush command.

11. The mass storage device of claim 8, wherein the sensing signal is a digital signal.

12. The mass storage device of claim 11, wherein the controller is configured to adjust the data write frequency of the memory unit according to the digital signal.

13. A mass storage device comprising:
   a connecting interface for receiving a controlling command from a host device;
   a memory unit, for storing data;
   a sense unit, for sensing an input voltage of the memory unit to generate a sensing signal corresponding to the input voltage; and a controller, coupled to the connecting interface, the memory unit and the sense unit for adjusting a data write frequency of the memory unit according to the sensing signal, wherein the controller is configured to adjust the data write frequency of the memory unit from a first frequency to a second frequency which is lower than the first frequency when the input voltage of the memory unit is lower than a first predefined voltage, and to adjust the data write frequency of the memory unit from the second frequency to the first frequency when the input voltage of the memory unit is higher than the first predefined voltage, and the controller further comprises a cache memory.

14. The mass storage device of claim 13 further comprising a power supply unit coupled to the controller and the memory unit for supplying the input voltage of the memory unit.

15. The mass storage device of claim 14, the connecting interface is a wireless connecting interface.

16. The mass storage device of claim 13, wherein the input voltage of the memory unit is provided from the host device through the connecting interface.

17. The mass storage device of claim 13, wherein the sense unit is integrated with the controller.

* * * * *